US006580965B2

(12) United States Patent
Fujiwara

(10) Patent No.: US 6,580,965 B2
(45) Date of Patent: Jun. 17, 2003

(54) RAW GARBAGE LIQUEFYING APPARATUS AND METHOD OF MANAGING SAME

(75) Inventor: Shintaro Fujiwara, Ichikawa (JP)

(73) Assignee: Exy Concept Co., Ltd., Kashiwa (JP)

( * ) Notice: Subject to any disclaimer, the term of this patent is extended or adjusted under 35 U.S.C. 154(b) by 27 days.

(21) Appl. No.: 09/874,961

(22) Filed: Jun. 7, 2001

(65) Prior Publication Data

US 2001/0051843 A1 Dec. 13, 2001

(30) Foreign Application Priority Data

Jun. 8, 2000 (JP) ........................................ 2000-172071

(51) Int. Cl.[7] .................................................. G06F 7/00
(52) U.S. Cl. ....................................... 700/213; 700/225
(58) Field of Search ................................ 700/213, 214, 700/215, 237, 241, 225

(56) References Cited

U.S. PATENT DOCUMENTS

| | | | | | |
|---|---|---|---|---|---|
| 4,423,987 | A | * | 1/1984 | Powers | 141/104 |
| 4,767,065 | A | | 8/1988 | Wray | |
| 5,004,392 | A | * | 4/1991 | Naab | 177/139 |
| 5,042,634 | A | * | 8/1991 | Gulmini | 100/902 |
| 5,641,127 | A | * | 6/1997 | Masumura | 241/17 |
| 5,718,163 | A | * | 2/1998 | Termini | 241/34 |
| 5,802,859 | A | * | 9/1998 | Zugibe | 62/125 |

FOREIGN PATENT DOCUMENTS

| | | |
|---|---|---|
| DE | 9416305 | 4/1995 |
| DE | 29814629 | 11/1998 |
| DE | 29605083 | 3/1999 |
| EP | 788984 | 8/1997 |
| FR | 2705952 | 12/1994 |
| JP | 11-167404 | 6/1998 |
| JP | 11-217104 | 8/1999 |
| JP | 2000-107622 | 9/2000 |

* cited by examiner

*Primary Examiner*—Khoi H. Tran
(74) *Attorney, Agent, or Firm*—Varndell & Varndell, PLLC

(57) ABSTRACT

A user who wishes to input raw garbage via an input opening of a raw garbage liquefying apparatus is identified, and input of raw garbage via the input opening is allowed only in cases where the user is judged to be appropriate. Also, a collector who wishes to collect raw garbage from a discharge opening of the raw garbage liquefying apparatus is identified, and collection of the raw garbage from the discharge opening is allowed only in cases where the collector is judged to be appropriate.

20 Claims, 3 Drawing Sheets

RAW GARBAGE LIQUEFYING APPARATUS AND METHOD OF MANAGING SAME

BACKGROUND OF THE INVENTION

1. Field of the Invention

The present invention relates to raw garbage liquefying apparatus and method of managing same, and more particularly, to raw garbage liquefying apparatus and method of managing same which allows management of the users of the raw garbage liquefying apparatus.

2. Description of the Related Art

Generally, collection of raw garbage is performed by a method wherein the date or day of the week on which a raw garbage collection vehicle tours around garbage collection points, is determined, and each household is requested to place their raw garbage at a predetermined collection point, early on the day on which the raw garbage collection vehicle passes by, for example. There is also another method wherein raw garbage is collected by previously arranged by telephone or the like so that the collection vehicle is requested to pass by a prescribed point at a prescribed date and time.

However, in methods where raw garbage is placed directly at garbage collection points, problems arise in that the garbage may be attacked by cats, crows, or the like, or it may produce unpleasant odours, before the collection vehicle arrives at the garbage collection point.

Therefore, in order to prevent the raw garbage from being attacked by cats, crows, etc., it is necessary to take measures such as providing a raw garbage collection container at the garbage collection point, placing a net over the garbage bags or the like.

However, in conventional methods using containers, nets and the like, such situations may sometimes occur that the quantity of raw garbage exceeds the storage capacity of the containers, or the generation of unpleasant odours cannot sufficiently suppressed. Hence, it causes problems to determine where garbage collection points are located because hygiene-related problems may occur in the neighborhood of the collection points.

Furthermore, if a large amount of raw garbage happens to be produced by household, then it must either request a another visit of the raw garbage collection vehicle, or the garbage must be stored in the household until the collection vehicle visits next time.

Since raw garbage will decompose with the passage of time, if the raw garbage is stored inside the household, problems arise with regard to hygiene, for instance, unpleasant odours are produced.

To solve the problems, a raw garbage collection system has been proposed, wherein raw garbage liquefying apparatuses are provided in distributed locations adjacent to respective households or the like, and the raw garbage liquefied by the raw garbage liquefying apparatus is collected and stored in highly sealed liquefied raw garbage deposit tanks. Then, the liquefied raw garbage deposited in the liquefied raw garbage deposit tanks is recovered periodically by touring collection vehicles, whereby raw garbage can be collected without dispersing unpleasant smells into the surrounding area.

By means of this raw garbage collection system, it is possible to place raw garbage into a raw garbage liquefying apparatus at any time, and hence generation of unpleasant odours due to decomposition of the raw garbage can be prevented, thereby providing a significant merits in terms of hygiene.

Moreover, since only raw garbage is stored in the deposit tanks, it is possible for the raw garbage collected by the touring collection vehicle to be used as a material resource, such as a fuel for a raw garbage power generation device, a raw material for organic fertilizer, etc.

However, when charging system is input for the collection of raw garbage, it is necessary to identify the user who places raw garbage in the raw garbage liquefying apparatuses, and to provide a measure to prevent anyone other than appropriate users from placing garbage in the devices.

Furthermore, if the raw garbage is to be used as a raw material, then it is necessary to prevent anyone other than an appropriate collector from collecting the garbage.

SUMMARY OF THE INVENTION

Therefore, it is an object of the present invention to provide raw garbage liquefying apparatus and method of managing same whereby users of the raw garbage liquefying apparatus can be identified.

The raw garbage liquefying apparatus according to the present invention is raw garbage liquefying apparatus situated in a plurality of distributed locations, for liquefying raw garbage input via an input opening and storing same in a storage unit, and discharging liquefied raw garbage stored in the storage unit, from a discharge opening, for collection; comprising user identifying means for identifying a user of the raw garbage liquefying apparatus inputting raw garbage via the input opening; and raw garbage input managing means for enabling input of raw garbage via the input opening only in cases where the user identified by the user identifying means is judged to be appropriate.

With this configuration, only appropriate users are allowed to inputting their raw garbage into the raw garbage liquefying apparatuses, and therefore it is possible to prevent use of the raw garbage liquefying apparatus by anyone other than appropriate users.

Moreover, with the user identifying means comprising a card reader provided in the vicinity of the input opening; and identifying means for identifying the user on the basis of information read out from a card carried by the user, it is possible to identify the user by using an existing card specifying a person, such a credit card.

The identifying means can also identify whether or not the user is appropriate from the information read out by the card reader from a card carried by the user by inquiring through wireless communications at the central station that manages the raw garbage liquefying apparatus.

With this configuration, it is not necessary to provide an identifying device at each of the liquefying apparatuses, and moreover, since inquiry is made at the central station, it is possible to process a large amount of read-out information in a short period of time.

It is also possible to adopt raw garbage input managing means comprising a door which opens and closes the input opening; and door opening and closing control means for opening the door by remote operation by wireless communications from the central station, if the central station judges the user to be appropriate.

With this configuration, only appropriate users are allowed to inputting raw garbage into the input opening, and inappropriate persons can be prevented from using the device.

The present invention is also raw garbage liquefying apparatus situated in a plurality of distributed locations, for liquefying raw garbage input via an input opening and storing same in a storage unit, and discharging liquefied raw garbage stored in the storage unit, from a discharge opening, for collection; comprising collector identifying means for identifying a collector collecting raw garbage liquefying apparatus from the discharge opening; and raw garbage discharge managing means for enabling discharge of raw garbage from the discharge opening only in cases where the collector identified by the collector identifying means is judged to be appropriate.

With this configuration, collection of liquefied raw garbage by any persons other than appropriate collectors is prevented. Therefore, it is possible to avoid unpleasant situations caused by inappropriate persons where, for instance, the discharge opening is opened and the liquefied raw garbage is scattered, or the like.

The collector identifying means comprises a card reader provided in the vicinity of the discharge opening; and identifying means for identifying the collector on the basis of information read out by the card reader from a card carried by the collector.

With this configuration, it is possible to use an existing card specifying the owner, such as a credit card, or the like, for identifying the collector.

Moreover, it is possible for the identifying means to identify whether or not the collector is appropriate by conducting inquiry about the information read out by the card reader from a card carried by the collector, through wireless communications at the central station that manages the raw garbage liquefying apparatus.

With this configuration, it is not necessary to provide an identifying device at the liquefying apparatus, and furthermore, since inquiry is made at the central station, it is possible to process a large amount of read-out information in a short period of time.

The raw garbage discharge managing means may comprise keying means for keying the discharge opening; and key-releasing control means for releasing the keying provided by the keying means, by remote operation by wireless communications from the central station, if the central station judges the collector to be appropriate.

With this configuration, only appropriate collectors are able to collect raw garbage from the discharge opening, and therefore collection by inappropriate persons can be prevented.

The present invention is a method of managing raw garbage liquefying apparatuses situated in a plurality of distributed locations, for liquefying raw garbage input via an input opening and storing same in a storage unit, and discharging liquefied raw garbage stored in the storage unit from a discharge opening, for collection, comprising the steps of identifying a user of the raw garbage liquefying apparatus inputting raw garbage via the input opening; and enabling input of raw garbage via the input opening only in cases where the identified user is judged to be appropriate.

With this configuration, it is possible to prevent use of the raw garbage liquefying apparatus by persons other than appropriate users.

Here, identification of the user is carried out on the basis of information read out from a card carried by the user, and therefore an existing card specifying the owner, such as a credit card, or the like, can be use for identifying the user.

Moreover, a configuration may be adopted wherein judgement of whether or not the user is appropriate is carried out by inquiry about the information read out from the card through wireless communications at the central station managing the raw garbage liquefying apparatus.

With this configuration, it is not necessary to provide an identifying device at the liquefying apparatus, and futhermore, since inquiry is made at the central station, it is possible to process a large amount of read-out information in a short period of time.

Moreover, by providing a door which opens and closes the input opening, the door being opened by remote operation by wireless communications from the central station, if the central station judges the user to be appropriate, it is possible to permit input of raw garbage only to appropriate users.

Furthermore, by adopting a configuration wherein the amount of raw garbage input via the input opening is measured and the input volume is totalised and managed for each user, it is possible to manage accurately the amount of raw garbage input by respective users, within a prescribed time period.

Moreover, charging or payment is conducted for the use of the raw garbage liquefying apparatus, on the basis of the input volume of raw garbage as totalised and managed for each user.

Therefore, charging or payment for the use of the raw garbage liquefying apparatus by the user can be conducted according to the amount of raw garbage input by each user.

Moreover, the present invention is also a method of managing raw garbage liquefying apparatus situated in a plurality of distributed locations, for liquefying raw garbage input via an input opening and storing same in a storage unit, and discharging liquefied raw garbage stored in the storage unit, from a discharge opening, for collection, comprising the steps of identifying a collector collecting liquefied raw garbage from the discharge opening; and enabling collection of liquefied raw garbage from the discharge opening, only in cases where the identified collector is judged to be appropriate.

With this configuration, collection of liquefied raw garbage by persons other than appropriate collectors is prevented, in addition to which it is also possible to avoid unpleasant situations caused by an inappropriate person, where, for instance, the discharge opening is opened and the liquefied raw garbage is scattered, or the like.

Since identification of the collector is carried out on the basis of information read out from a card carried by the user, it is possible to assign cards to each collection operating company, or each touring collection vehicle, rather than to each individual collector.

Moreover, it is also possible for judgement of whether or not the collector is appropriate to be carried out by inquiry about the information read out from the card through wireless communications at the central station managing the raw garbage liquefying apparatus.

With this configuration, it is not necessary to provide an identifying device at the liquefying apparatuses, and moreover, since inquiry is made at the central station, it is possible to process a large amount of read-out information in a short period of time.

There may also be provided keying means for keying the discharge opening; the key being released by remote operation by wireless communications from the central station, if the central station judges the collector to be appropriate.

With this configuration, only appropriate collectors are able to collect raw garbage from the discharge opening, and therefore collection by inappropriate persons can be prevented.

Moreover, by measuring the amount of discharged raw garbage output via the discharge opening and totalising and managing the discharge volume for each raw garbage liquefying apparatus, then the discharged amount of liquefied raw garbage collected from each raw garbage liquefying apparatus within a prescribed time period can be managed accurately.

A configuration may be adopted wherein charging or payment is conducted for the use of the raw garbage liquefying apparatus, on the basis of the discharged volume of raw garbage as totalised and managed for each raw garbage liquefying apparatus.

With this configuration, charging or payment to a collector for the use of the raw garbage liquefying apparatus is conducted on the basis of the collected volume of raw garbage by the collector.

In raw garbage liquefying apparatus and method of managing same according to the present invention, a user of the raw garbage liquefying apparatus inputting raw garbage via an input opening is identified, and the user is only permitted to inputting the raw garbage via the input opening if that user is judged to be appropriate.

According to the present invention, input of raw garbage is only permitted when a user is judged to be appropriate, and therefore any users judged to be inappropriate can be prevented from using the raw garbage liquefying apparatus.

With this configuration, charging or payment is made accurately, according to the amount of raw garbage collected by each collector, for a collector's use of the raw garbage liquefying apparatus.

Moreover, a person collecting the liquefied raw garbage via a discharge opening is identified, and the collector is only permitted to discharge the liquefied raw garbage from the discharge opening if that collector is judged to be appropriate.

Therefore, it is possible to prevent collection of liquefied raw garbage by any inappropriate collectors, or any unpleasant situations wherein the discharge opening is opened and the liquefied raw garbage is caused to flow out.

Moreover, since the users and respective input amounts or the collectors and respective collection amounts can be managed jointly, it is possible to conduct payment or charging accurately, corresponding to the amount of garbage input or collected.

DESCRIPTION OF THE PREFERRED EMBODIMENTS

Embodiment of the raw garbage liquefying apparatus and a method of managing same according to the present invention is now described with reference to the accompanying drawings.

Figure 1:
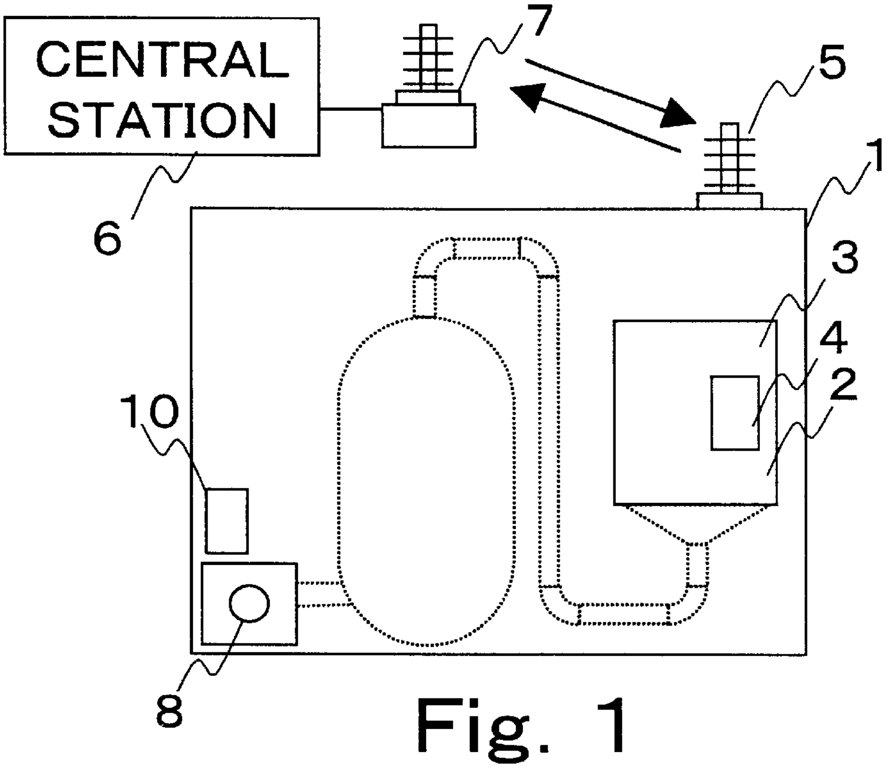
FIG. 1 is a conceptual diagram of a method of managing a raw garbage liquefying apparatus according to the present invention.

FIG. 1 is a conceptual diagram illustrating a raw garbage liquefying apparatus 1 and a method of managing same according to the present invention, in which there are provided a raw garbage liquefying apparatus 1, central station 6, radio communications device 5, 7 and card readers 4, 10.

Figure 2:
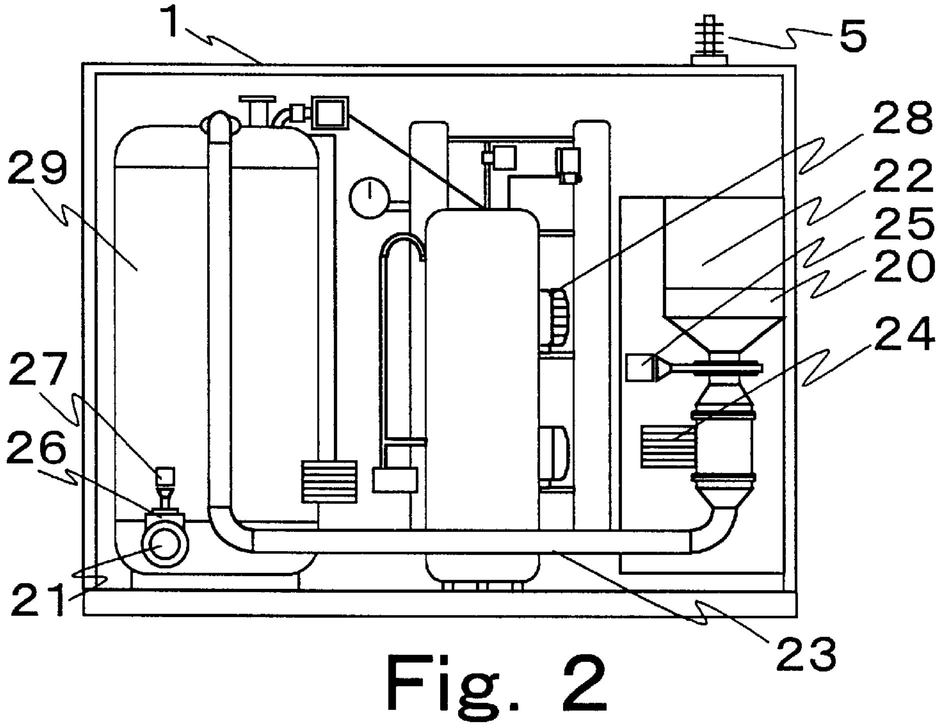
FIG. 2 is a conceptual diagram of a raw garbage liquefying apparatus according to an embodiment of the present invention.

As shown in FIG. 2, the raw garbage liquefying apparatus 1 comprises an input opening 20 for inputting raw garbage, a storage unit 29 for storing liquefied raw garbage, and a discharge opening 21 for discharging liquefied raw garbage, the input opening 20 and the storage unit 29 being connected by means of an input section 23, and the storage unit 29 and the discharge opening 21 being connected by means of a discharging section 26.

An input opening door 22 is provided in the input opening 20, a chopping cutter 24 and input opening shut-off valve 25 are provided in the input section 23, and a discharge shut-off valve 27 is provided in the discharging section 26.

The raw garbage liquefying apparatus 1 is also provided with a gas exhaust device 28 for reducing the air pressure of the interior of the input section 23 and the storage unit 29.

The input opening door 22 and the discharge opening 21 are normally locked by means of keys (not illustrated in the diagrams).

Figure 3:
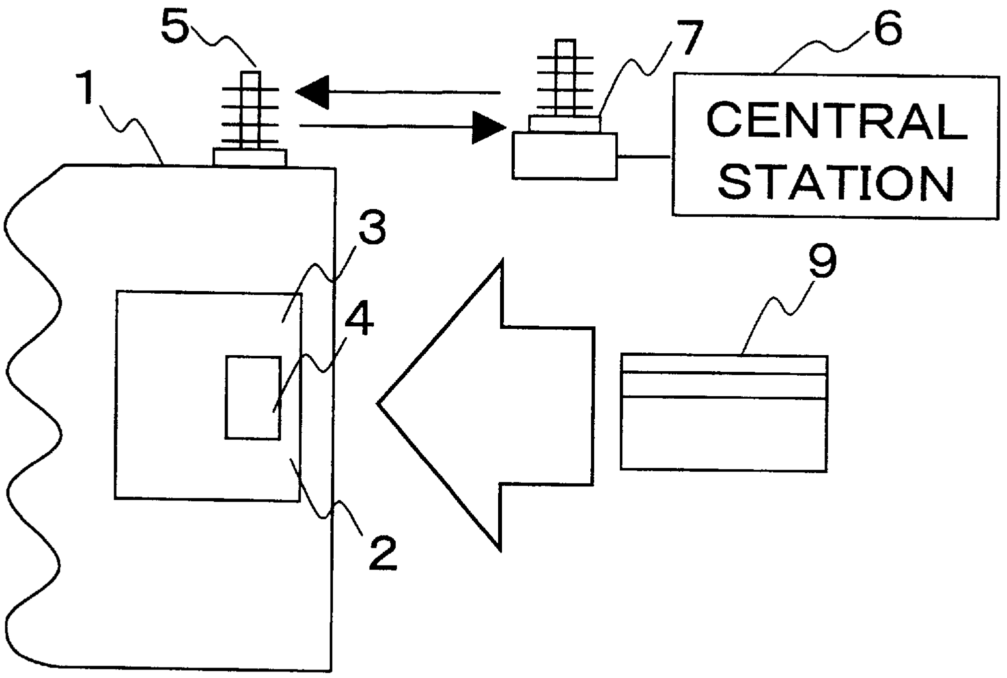
FIG. 3 is a conceptual diagram of a method of managing raw garbage liquefying apparatus according to an embodiment of the present invention.

As shown in FIG. 3, when inputting raw garbage to the raw garbage liquefying apparatus 1, firstly, the card reader 4 reads in data from a card 9 owned by the user, and the information read out from the card is sent to the central station 6 via the radio communications devices 5, 7.

If the central station 6 judges that the user is an appropriate user, then it releases the key provided at the input opening door 3, by means of the radio communications devices 5, 7, thereby allowing raw garbage to be input via the input opening 2.

Alternatively, rather than simply releasing a key, it is possible for the input opening door 3 to be opened by operating a driving device (not illustrated), according to a command from the central station 6.

Referring to FIG. 2, at the raw garbage liquefying apparatus 1, once the gas in the interior of the input section 23 and the storage unit 29 has been removed by the gas exhaust device 28 while the input opening shut-off valve 25 and the discharge opening shut-off valve 27 have closed, the key of the input opening door 22 is released according to a command from the central station 6.

Raw garbage is then input via the input opening 20, and when the input opening door 22 is closed, the input opening shut-off valve 25 is opened and the input raw garbage is conveyed into the storage unit 29 due to the pressure difference between the input opening 20 and the storage unit 29. The raw garbage is then chopped and liquefied by the chopping cutter 24.

Figure 4:
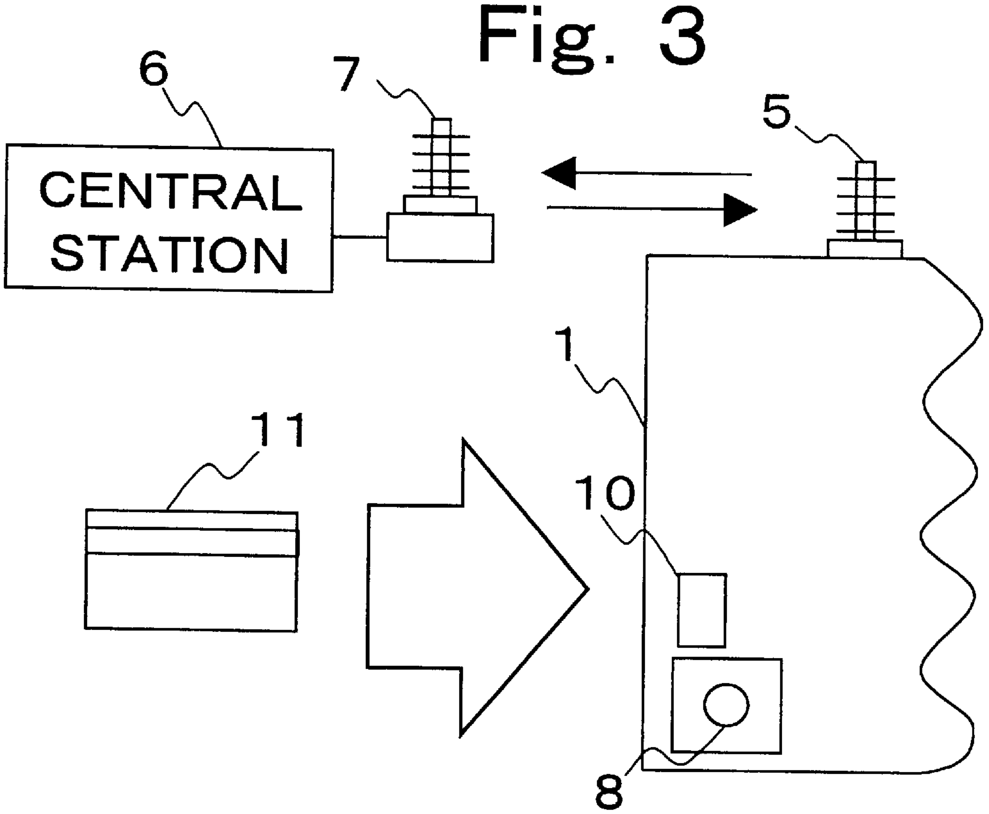
FIG. 4 is a conceptual diagram of a method of managing raw garbage liquefying apparatus according to an embodiment of the present invention.

Thereupon, when collecting the liquefied raw garbage stored in the raw garbage liquefying apparatus 1, firstly, as shown in FIG. 4, the card reader 10 reads out data from a card 11 owned by the collector and sends the information read out from the card to the central station 6, by means of the radio communications device 5, 7.

If the central station 6 judges that the collector is an appropriate collector, then it causes the key provided at the discharge opening 8 to be released, by means of the radio communications device 5, 7, thereby allowing the liquefied raw garbage to be collected from the discharge opening 8.

The collector may connect a hose linked to the tank of the collection vehicle to the discharge opening, and cause the liquefied raw garbage to be conveyed into the tank of the collection vehicle by means of suction from the collection vehicle, or, by applying pressure to the liquefied raw garbage from the raw garbage liquefying apparatus.

Figure 5:
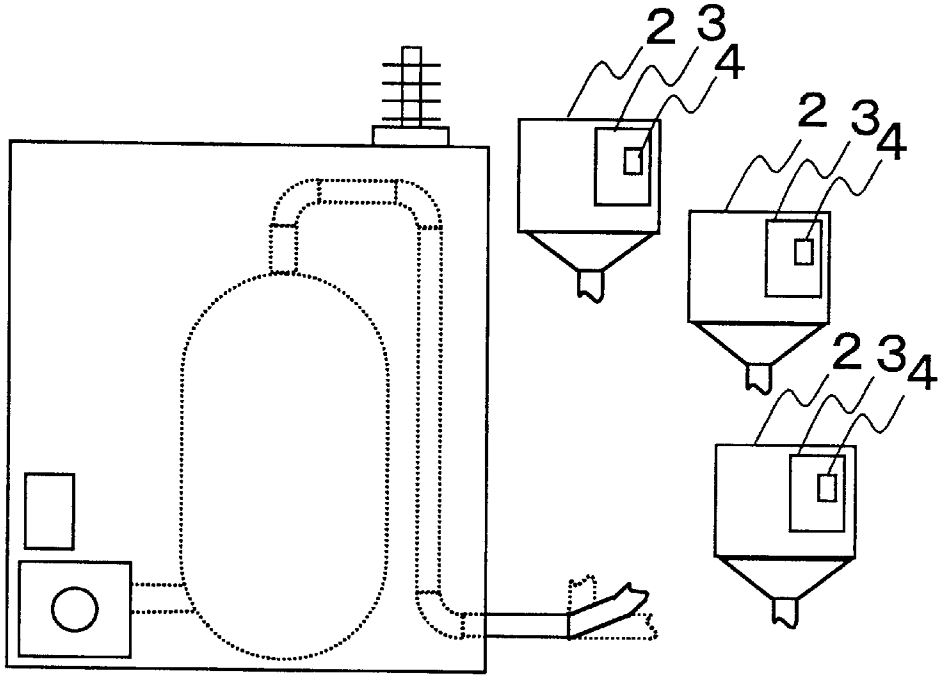
FIG. 5 is a conceptual diagram of a method of managing raw garbage liquefying apparatus according to the present invention.

As shown in FIG. 5, it is also possible to liquefy and accumulate raw garbage input from a plurality of input openings 2, in a single raw garbage liquefying apparatus, and to collect the raw garbage in a single operation.

In this, if the users situate the input openings 2 in predetermined locations, such as respective households, kitchens, or the like, then it is possible to identify and manage the users by means of the input opening 2 where the raw garbage is input, without providing a card reader 4 or key.

Moreover, by providing a measuring device for measuring the amount of raw garbage input into the raw garbage liquefying apparatus, and transmitting the amount of raw garbage input to the central station, it is possible to manage the raw garbage input amount for each user, at the central station.

Therefore, charging or payment for the use of the raw garbage liquefying apparatus can be conducted in accordance with the amount of raw garbage input by each user.

The measuring device is able to measure the amount of input raw garbage not only by simply measuring the weight or volume of raw garbage input via the input opening, but also from the increase in the stored amount of liquefied raw garbage by using an storage sensor (not illustrated) for detecting the amount of liquefied raw garbage stored in the storage unit.

By providing a measuring device which measures the volume of liquefied raw garbage discharged from the raw garbage liquefying apparatus and transmits this amount of discharged raw garbage to the central station, it is possible to manage the amount of discharged raw garbage for each raw garbage liquefying apparatus, at the central station.

A plurality of collectors may collect the raw garbage from a single raw garbage liquefying apparatus. In that case, the central station can manage the amount of liquefied raw garbage collected by each collector.

Consequently, charging or payment for collection of the liquefied raw garbage can be conducted to each collector, according to the amount of raw garbage collected.

In order to measure the amount of liquefied raw garbage collected, if a measuring sensor is provided which detects the amount of liquefied raw garbage stored in the collection tank of the collection vehicle recovering the raw garbage, rather than simply measuring the amount of liquefied raw garbage collected by means of the amount of liquefied raw garbage flowing out of the raw garbage liquefying apparatus, then the increase in the amount of stored liquefied raw garbage can be measured and transmitted from the collection vehicle to the central station as a collection amount.

Moreover, in order to identify the user or collector, by using a card which allows data to be written and updated such as a rewrite card, the user or collector can be identified by means of the card readers, and required information relating to the user or collector such as the amount of raw garbage input or collected by the user, can be written to the card.

Therefore, the user or collector is able readily to manage their own raw garbage input amount or collection amount, and the like.

Furthermore, by using a credit card, prepaid card, or the like, to identify the user or collector, it is possible not only to confirm the user or collector, but also to apply a charge corresponding to the amount of raw garbage input or collected by the user or collector.

What is claimed is:

1. A raw garbage liquefying apparatus situated in a plurality of locations, for liquefying raw garbage input via an input opening, storing the liquefied raw garbage in a storage unit, and discharging the liquefied raw garbage stored in the storage unit from a discharge opening for collection, comprising:

user identifying means for identifying a user who wants to input raw garbage via the input opening of the raw garbage liquefying apparatus; and raw garbage input managing means for enabling the input of raw garbage via the input opening only in cases where the user identified by the user identifying means is judged to be appropriate.

2. The raw garbage liquefying apparatus according to claim 1, wherein the user identifying means comprises:

a card reader provided in a vicinity of the input opening, for reading information from a card carried by the user; and identification means for identifying the user based on the information read out by the card reader from the card carried by the user.

3. The raw garbage liquefying apparatus according to claim 2, wherein the identification means identifies whether or not the user is appropriate by inquiring at a central station managing the raw garbage liquefying apparatus about the information read out by the card reader from the card carried by the user by wireless communications.

4. The raw garbage liquefying apparatus according to claim 3, wherein the raw garbage input managing means comprises:

a door which opens and closes the input opening; and door opening and closing control means for opening the door by remote operation by wireless communications from the central station if the central station judges the user to be appropriate.

5. A raw garbage liquefying apparatus situated in a plurality of locations, for liquefying raw garbage input via an input opening, storing the liquefied raw garbage in a storage unit, and discharging the liquefied raw garbage stored in the storage unit from a discharge opening for collection, comprising:

collector identifying means for identifying a collector collecting liquefied raw garbage from the discharge opening; and raw garbage discharge managing means for enabling discharge of the liquefied raw garbage from the discharge opening only in cases where the collector identified by the collector identifying means is judged to be appropriate.

6. The raw garbage liquefying apparatus according to claim 5, wherein the collector identifying means comprises:

a card reader provided in a vicinity of the discharge opening, for reading information from a card carried by the collector; and identification means for identifying the collector based on the information read out by the card reader from the card carried by the collector.

7. The raw garbage liquefying apparatus according to claim 6, wherein the identification means identifies whether or not the collector is appropriate by inquiring at a central station managing the raw garbage liquefying apparatus about the information read out by the card reader from the card carried by the collector by wireless communications.

8. The raw garbage liquefying apparatus according to claim 5, wherein the liquefied raw garbage discharge managing means comprises: keying means for keying the discharge opening; and key-releasing control means for releasing the keying provided by the keying means, by remote operation by wireless communications from the central station, if the central station judges the collector to be appropriate.

9. A method of managing raw garbage liquefying apparatus situated in a plurality of locations, for liquefying raw garbage input via an input opening, storing the liquefied raw garbage in a storage unit, and discharging the liquefied raw garbage stored in the storage unit from a discharge opening for collection, comprising the steps of:

identifying a user who wishes to input raw garbage via the input opening of the raw garbage liquefying apparatus; and enabling input of raw garbage via the input opening only in cases where the user is judged to be appropriate.

10. The method of managing raw garbage liquefying apparatus according to claim 9, wherein identification of the user is carried out based on information read out from a card carried by the user.

11. The method of managing raw garbage liquefying apparatus according to claim 10, wherein judgement of whether or not the user is appropriate is carried out by inquiring at a central station managing the raw garbage liquefying apparatus about the information read out from the card by wireless communications.

12. The method of managing raw garbage liquefying apparatus according to claim 11, wherein the raw garbage liquefying apparatus comprises a door which opens and closes the input opening, and the door is opened by remote operation by wireless communications from the central station, if the central station judges the user to be appropriate.

13. The method of managing raw garbage liquefying apparatus according to claim 9, wherein the amount of input raw garbage input via the input opening is measured and the input volume is totalised and managed for each user.

14. The method of managing raw garbage liquefying apparatus according to claim 13, wherein charging or payment is conducted for use of the raw garbage liquefying apparatus based on the input volume of raw garbage as totalised and managed for each user.

15. A method of managing raw garbage liquefying apparatus situated in a plurality of locations, for liquefying raw garbage input via an input opening, storing the liquefied raw garbage in a storage unit, and discharging the liquefied raw garbage stored in the storage unit from a discharge opening for collection, comprising the steps of:

identifying a collector who wishes to collect liquefied raw garbage from the discharge opening; and enabling collection of liquefied raw garbage from the discharge opening, only in cases where the collector is judged to be appropriate.

16. The method of managing raw garbage liquefying apparatus according to claim 15, wherein the identification of the collector is carried out based on information read out from a card carried by the collector.

17. The method of managing raw garbage liquefying apparatus according to claim 16, wherein the judgement of whether or not the collector is appropriate is carried out by inquiring at a central station managing the raw garbage liquefying apparatus about the information read out from the card by wireless communications.

18. The method of managing raw garbage liquefying apparatus according to claim 17, wherein the raw garbage liquefying apparatus comprises keying means for keying the discharge opening, the key means being released by remote operation by wireless communications from the central station if the central station judges the collector to be appropriate.

19. The method of managing raw garbage liquefying apparatus according to claim 15, wherein the amount of discharged raw garbage output via the discharge opening is measured and the discharge volume is totalised and managed for each raw garbage liquefying apparatus.

20. The method of managing raw garbage liquefying apparatus according to claim 19, wherein charging or payment is conducted for the use of the raw garbage liquefying apparatus, based on the discharged volume of raw garbage as totalised and managed for each raw garbage liquefying apparatus.

* * * * *